United States Patent [19]

Moriwake

[11] Patent Number: 5,577,174
[45] Date of Patent: Nov. 19, 1996

[54] VIDEO DATA PROCESSING APPARATUS AND METHOD FOR SMOOTHLY INTERSECTING IMAGES

[75] Inventor: Katsuakira Moriwake, Kanagawa, Japan

[73] Assignee: Sony Corporation, Tokyo, Japan

[21] Appl. No.: 854,387

[22] Filed: Mar. 19, 1992

[30] Foreign Application Priority Data

Mar. 29, 1991 [JP] Japan ................................ 3-066734

[51] Int. Cl.⁶ .................................................. H04N 5/262
[52] U.S. Cl. .......................................... 395/119; 395/121
[58] Field of Search ...................................... 395/119, 121, 395/122, 127, 135; 358/22

[56] References Cited

U.S. PATENT DOCUMENTS 4,918,626  4/1990  Watkins et al. ........................ 395/121
5,077,608  12/1991  Dubner .................................... 358/183

FOREIGN PATENT DOCUMENTS 0321095  6/1989  European Pat. Off. .

*Primary Examiner*—Mark K. Zimmerman
*Assistant Examiner*—Cliff N. Vo
*Attorney, Agent, or Firm*—William S. Frommer; Alvin Sinderbrand

[57] ABSTRACT

Method and apparatus for generating a composite three-dimensional video image data signal from first and second three-dimensional image data signals, in which the first three-dimensional image data signal is comprised of a first video data signal and a first depth data signal and the second three-dimensional image data signal is comprised of a second video data signal and a second depth data signal. The difference between the first and second depth data signals is calculated so as to form a difference signal from which a signal representing the sign of the difference signal is generated. Average values are obtained, at a rate corresponding to a pixel processing rate, between the sign signal and the rate of change of the difference between the first depth data signal and the second depth data signal, in which the rate of change is calculated when the sign signal has a predetermined value. The first and second three-dimensional image data signals are combined in accordance with a key data signal which is selected from one of the average values and the sign signal.

12 Claims, 5 Drawing Sheets

FIG. 6A  S3    -10   -4    1    6    11

FIG. 6B  PIXELS | (n-2) | (n-1) | (n) | (n+1) | (n+2)
                                  ↑t1

VIDEO DATA PROCESSING APPARATUS AND METHOD FOR SMOOTHLY INTERSECTING IMAGES

BACKGROUND OF THE INVENTION

1. Field of the Invention

This invention relates to a video data processing apparatus and method for combining video signals.

2. Description of the Prior Art A video data processing apparatus for transforming a video signal is known in the prior art, for example, from U.S. Pat. Nos. 4,791,581 and 4,965,844. In such a video data processing apparatus, a three-dimensional video image having a three-dimensional effect has been produced by adding a Z-axis to the two-dimensional effect of the X-axis and Y-axis on the screen. It is also known that a new three-dimensional video image can be produced by synthesizing or combining at least two three-dimensional video images. As an example, first and second video data produced from two digital video effect (DVE) systems can be combined by a third DVE system to form new video data.

FIG. 1 is a block diagram of a known DVE system. The DVE system comprises a mixing circuit 1 and a key signal generation circuit 2. The mixing circuit 1 is supplied with first and second video data S1 and S2, respectively, which are to be synthesized. The key signal generation circuit 2 is supplied with first and second depth data S1Z and S2Z which correspond to the first and second video data S1 and S2, respectively. The key signal generation circuit 2 decides the positional relation between the superimposed images, or the so-called priority, from the supplied first and second depth data S1Z and S2Z, and produces key data or a key signal SK which is supplied to the mixing circuit 1. The mixing circuit 1 determines which video data is to be selected from among the first and second video data S1 and S2 on the basis of the key data SK so as to produce composite video data S3. That is, if the value of the key data SK is 1, the first video data S1 is outputted as the video data S3. If, on the other hand, the value of the key data SK is 0, the second video data S2 is outputted as the video data S3.

FIG. 2 shows an example of a new or composite three-dimensional video image corresponding to synthesized video data produced by the above-described synthesizing technique. This new three-dimensional video image is formed from a first three-dimensional video image 6 corresponding to the first video data S1 and a second three-dimensional video image 7 corresponding to the second video data S2.

In this known system, however, the key data SK may cause an incorrect and undesirable video image to be formed. For example, consider the situation in which the key data SK indicates the positional relation of a part 9 of the video image which is located at an intersection 8 on a one-dot chain line 11 as shown in FIG. 2. In this situation, the key data may be formed by pixel units which may be conceptually indicated by bits of 0 or 1 as shown in FIG. 3. With such key data, notches may be produced at the intersection 8 between the first and second video images 6 and 7, respectively, as shown in FIG. 2.

SUMMARY OF THE INVENTION

Accordingly, it is an object of the present invention to provide a technique for producing video data which avoids the above-mentioned disadvantages of the prior art.

More specifically, it is an object of the present invention to provide a technique for producing video data which enables intersections between first and second three-dimensional video images to appear smooth.

According to the present invention there is provided a video data signal processing apparatus for generating a composite three-dimensional video image data signal from first and second three-dimensional image data signals, in which the first three-dimensional image data signal represents a plurality of pixels and is comprised of a first video data signal and a first depth data signal and the second three-dimensional image data signal represents a plurality of pixels and is comprised of a second video data signal and a second depth data signal, the video data signal processing apparatus comprising:

synthesizing means for combining the first three-dimensional image data signal and the second three-dimensional image data signal in accordance with a key data signal; and key data signal generating means including subtracting means for calculating a difference between the first depth data signal and the second depth data signal and for supplying an output signal therefrom which represents the difference and a sign of the difference, sign generating means for generating a signal representing the sign of the difference in the output signal from the subtracting means, arithmetic ratio means for calculating a rate of change in the difference between the first depth data signal and the second depth data signal when the sign signal from the sign generating means has a predetermined value, averaging means for averaging an output signal of the arithmetic ratio means and the sign signal from the sign generating means at a rate corresponding to a pixel processing rate, and means for selecting the key data signal from one of an output signal from the averaging means and the sign signal from the sign generating means.

According to the present invention there is also provided a method of generating a composite three-dimensional video image data signal from first and second three-dimensional image data signals, in which the first three-dimensional image data signal represents a plurality of pixels and is comprised of a first video data signal and a first depth data signal and the second three-dimensional image data signal represents a plurality of pixels and is comprised of a second video data signal and a second depth data signal, the method comprising the steps of: calculating a difference between the first depth data signal and the second depth data signal so as to form a difference signal; generating a signal representing a sign of the difference signal; calculating a rate of change of the difference between the first depth data signal and the second depth data signal when the sign signal has a predetermined value; averaging the rate of change of the difference and the sign signal at a rate corresponding to a pixel processing rate so as to form an average signal; selecting a key data signal from one of the average signal and the sign signal; and combining the first three-dimensional image data signal and the second three-dimensional image data signal in accordance with the key data signal.

The above, and other objects, features and advantages of this invention, will be apparent from the following detailed description of the illustrative embodiments which are to be read in connection with the accompanying drawings in which corresponding parts are identified by the same reference numerals.

BRIEF DESCRIPTION OF THE DRAWINGS

FIGS. 6A through 6L are diagrams to which reference will be made in explaining the operation of the apparatus of FIG. 4.

DESCRIPTION OF THE PREFERRED EMBODIMENTS

A video data processing apparatus according to an embodiment of the present invention will now be described with reference to FIGS. 4–7.

Figure 4:
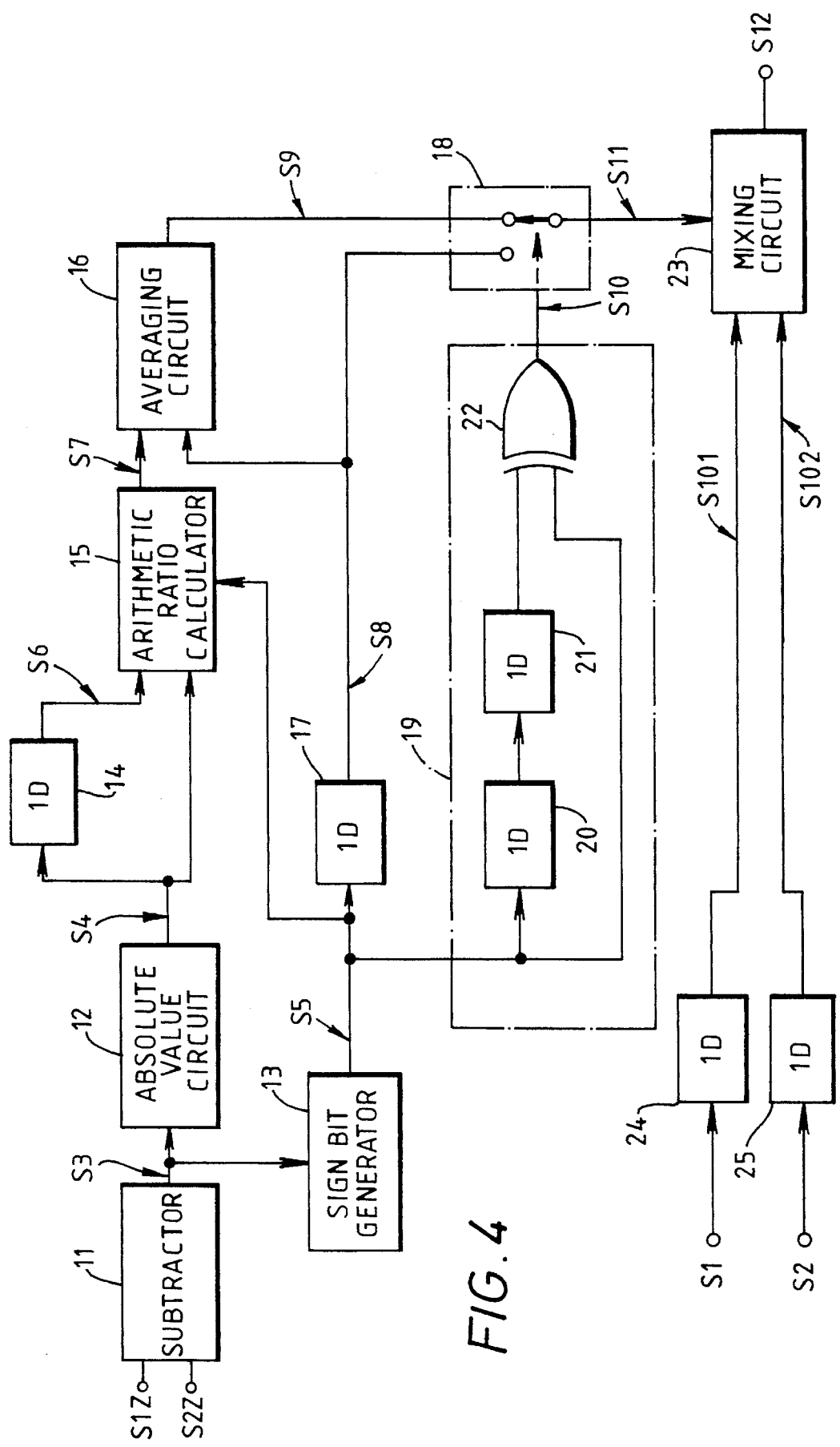
FIG. 4 is a block diagram of a video data processing apparatus according to an embodiment of the invention.

The processing apparatus of FIG. 4 comprises a subtracter 11 which is supplied with first and second depth data S1Z and S2Z, respectively, and produces difference data S3 (S3=S1Z-S2Z). The difference data S3 is supplied to an absolute value circuit 12 and a sign bit generator 13. The absolute value circuit 12 supplies absolute value data S4 (S4=|S3|) to a delay circuit 14 and to an arithmetic ratio calculator 15. The sign bit generator 13 produces sign data S5 which, for example, may be '1' when the difference data S3 are positive, and '0' when they are negative. The sign data S5 are supplied to the arithmetic ratio calculator 15, a delay circuit 17 and an around-point-of-change detector 19.

The delay circuit 14 delays the absolute value data S4 by an amount corresponding to one pixel period, and supplies such data as delayed absolute value data S6 to the arithmetic ratio calculator 15. The arithmetic ratio calculator 15 calculates ratio data S7 in accordance with equation (1) below, only when the sign data S5 are inverted, and supplies the ratio data S7 to an input terminal of an averaging circuit 16. The value of the calculated ratio data S7 is held until the sign data S5 are again inverted.

$$S7=S4/(S4+S6) \qquad (1)$$

The averaging circuit 16 receives, at its other input terminal, a delayed sign data S8 from the delay circuit 17 which is produced by delaying the sign data S5 by an amount corresponding to one pixel period. The averaging circuit 16 calculates the mean value, for example, the arithmetic mean value, of the ratio data S7 and the delayed sign data S8 in accordance with equation (2) below, and supplies the obtained arithmetic mean data S9 to one contact of a switch 18.

$$S9=(S7+S8)/2=[\{S4/(S4+S6)\}+S8]/2 \qquad (2)$$

The delayed sign data S8 are further supplied to the other contact of the switch 18. The movable contact of the switch 18 is controlled by around-point-of-change data S10 supplied from the around-point-of-change detector 19. The around-point-of-change detector 19 includes one-pixel delay circuits 20 and 21 and an exclusive-OR circuit 22, and is responsive to the sign data S5 to produce the around-point-of-change data S10 as a gate signal which indicates points around the point of change of the sign data S5, or the positions of pixels before and after that point.

In response to receiving the around-point-of-change data S10 the movable contact of the switch 18 selects either the delayed sign data S8 or the arithmetic mean data S9 which are then supplied as key data S11 to a control input terminal of a mixing circuit 23. The mixing circuit 23 is also supplied, at its data input terminals with first video data S101 and second video data S102 from one-pixel delay circuits 24 and 25 which are respectively produced therein by delaying the first video data S1 and the second video data S2 which are the two-dimensional input video data. The mixing circuit 23 performs an arithmetic computation according to equation (3) below which produces synthesized video data S12.

$$S12=S11*S102+(1-S11)*S101 \qquad (3)$$

The operation of the above embodiment will now be described in detail with reference to the drawings. The following description is based on the synthesized image shown in FIG. 2.

Figure 1:
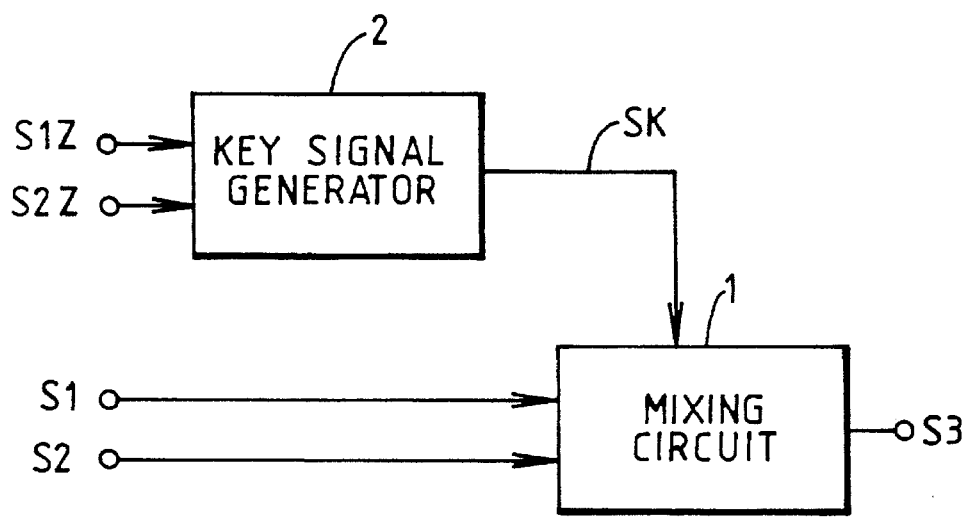
FIG. 1 is a block diagram of a known video data processing apparatus.
Figure 2:
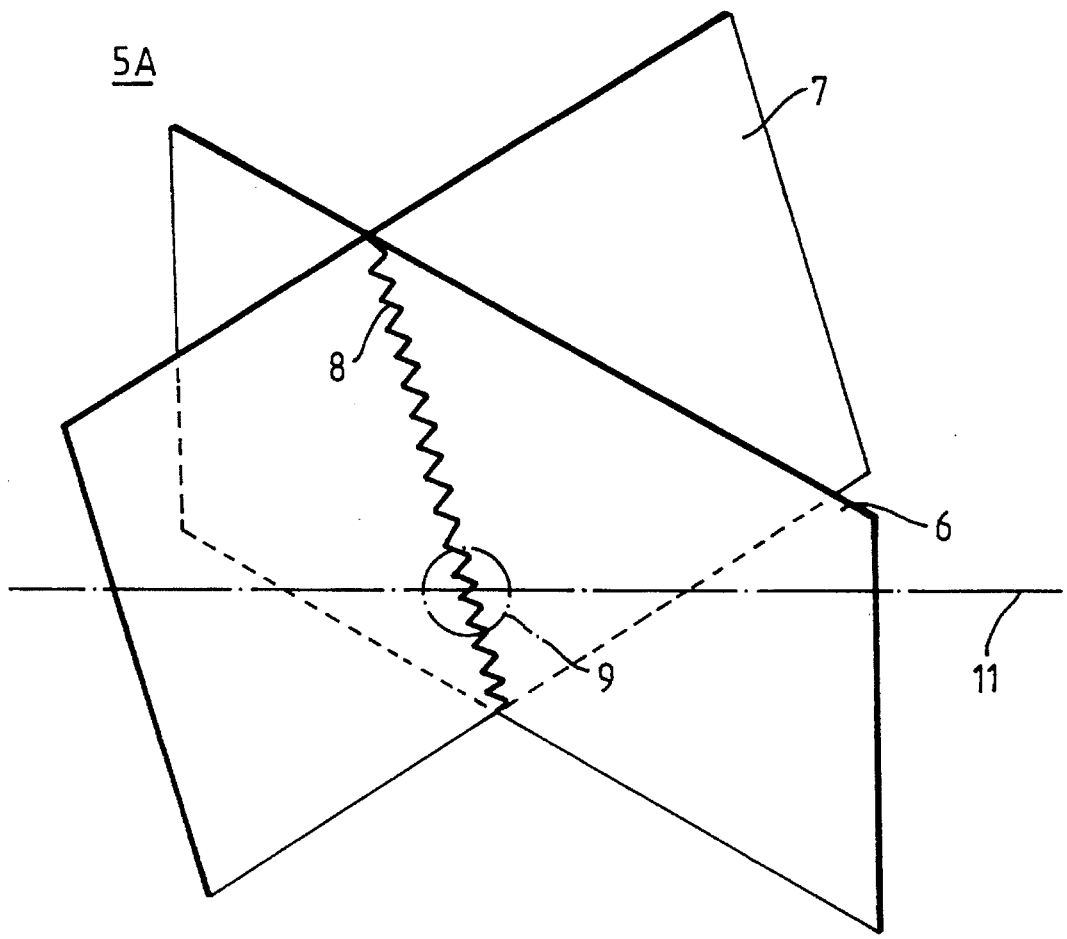
FIG. 2 is a diagram of an example of a video image corresponding to synthesized video data produced by the apparatus of FIG. 1.
Figure 5A:
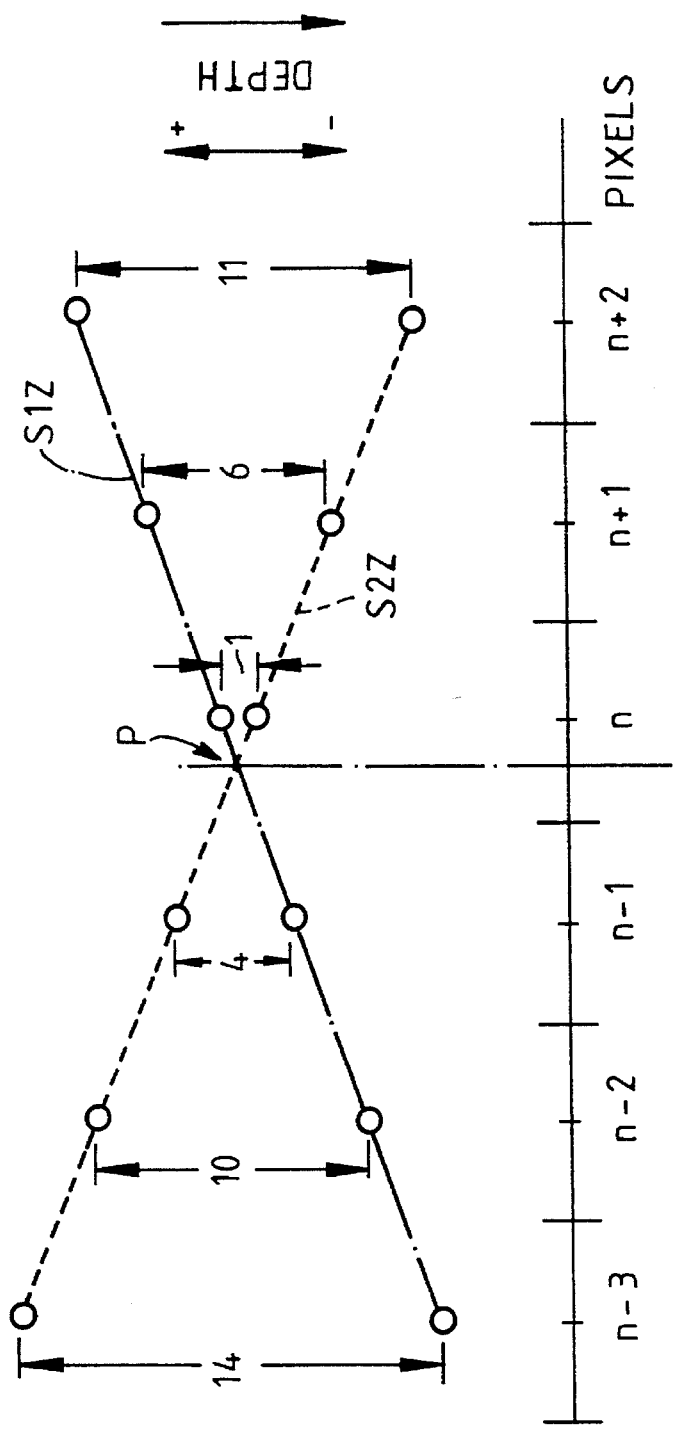
FIG. 5A is a two-dimensional diagram of depth data which may be used by the apparatus of FIG. 4.

FIG. 5A shows, two-dimensionally, the first video image-6 depth data S1Z and the second video image-7 depth data S2Z of the video image 9, which is located along the intersection 8 at the one-dot chain line 11 as shown in FIG. 2. In FIG. 5A, the + direction corresponds to a direction which extends out of the paper and the - direction corresponds to the opposite direction, which may be referred to as a depth direction. From FIG. 5A it is seen that the true intersection of the S1Z and S2Z data is located at an intersection P. The first and second depth data S1Z and S2Z and the first and second video data S1 and S2 are integrally combined to form the data of each pixel. In other words, the pixel data are formed from the video data and the depth data.

The difference data S3, calculated by the subtracter 11, may have a value of, for example, S3=-4 at pixel (n-1) and S3=1 at pixel n. In this example, the absolute value data S4, calculated by the absolute value circuit 12, has a value of S4=4 at pixel (n-1), and S4=1 at pixel n. The sign data S5 produced by the sign bit generator 13 may have values as shown by FIG. 6C which are obtained from the relation of the difference data S3 (see FIG. 6A) and the pixel clock (see FIG. 6B). Therefore, in this situation, the delayed sign data S8 from the delay circuit 17, the output from the delay circuit 21 and the around-point-of-change data S10 from the around-point-of-change detector 19 have the values indicated in FIGS. 6D to 6F, respectively. The first and second video data S101 and S102 fed to the input terminals of the mixing circuit 23 from the delay circuits 24 and 25 are respectively produced by delaying the first and second video data S1 and S2 by one-pixel period, as shown in FIGS. 6G and 6H, respectively.

The above absolute value data S4 and delayed absolute value data S6 are shown in FIG. 6I in relation to the pixel clock. The ratio data S7 from the arithmetic ratio calculator 15 is, as mentioned above, calculated in accordance with equation (1) only when the sign data S5 inverts. The ratio data S7 is supplied to one input terminal of the averaging circuit 16, which holds the calculated ratio data S7 until the sign data S5 again inverts. In the above situation, since the sign data S5 is inverted at a time which occurs between pixels (n-1) and n, the ratio data S7 are calculated as S7=S4/(S4+S6)=1/(1+4)=0.2 at that time. At the pixel n and the following pixels, the averaging circuit holds S7=0.2. This ratio data S7 is shown in FIG. 6J.

Figure 5B:
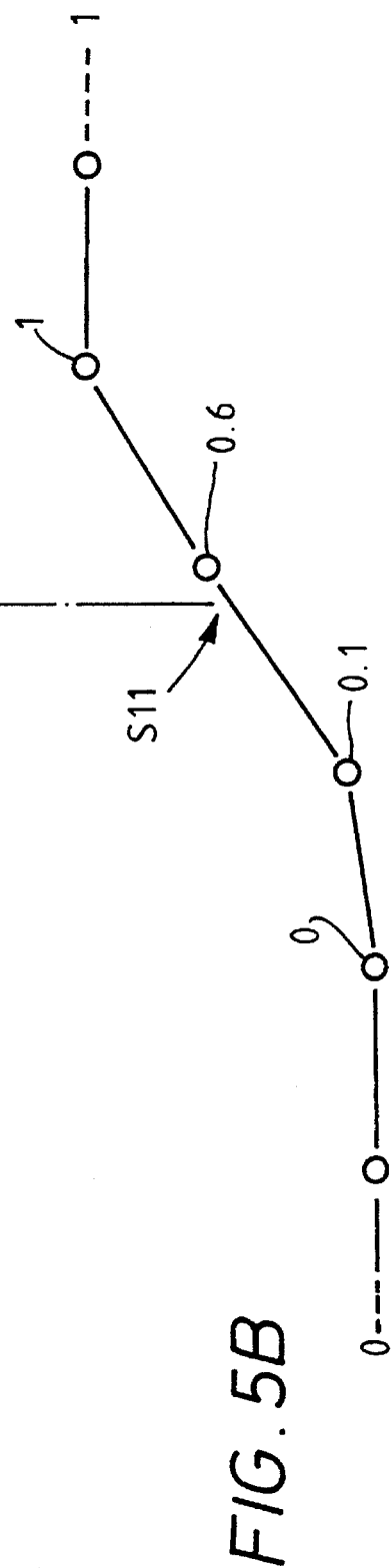
FIG. 5B is a two-dimensional diagram of key data which may be used by the apparatus of FIG. 4.

The arithmetic mean data S9 can be calculated from the above equation (2) S9=(S7+S8)/2, and, in the above situation, is equal to (0.2+0)/2=0.1 and (0.2+1)/2=0.6 at pixel n and (n+1), respectively. When the around-point-of-change data S10 are S10=1 (high level), the switch 18 selects the arithmetic mean data S9 which are supplied to the mixing circuit 23 as the key data S11. When S10=0 (low level), the switch 18 selects the delayed sign data S8 which are supplied to the mixing circuit 23 as the key data. Therefore, the key data S11 shown in FIG. 6L are supplied to the mixing circuit 23. FIG. 5B shows two-dimensionally this key data S11. Upon receiving the key data S11, the mixing circuit 23 mixes the first and second video data S101 and S102 in accordance with the above equation (3) so as to produce the synthesized video data S12.

Figure 3:
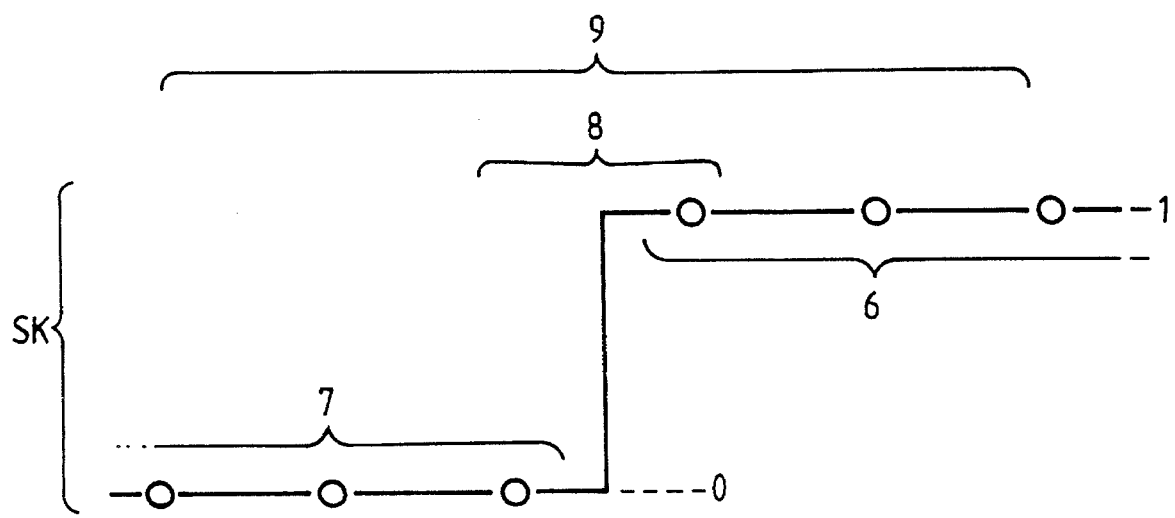
FIG. 3 is a diagram used to explain the key data which produces the diagram of FIG. 2.
Figure 7:
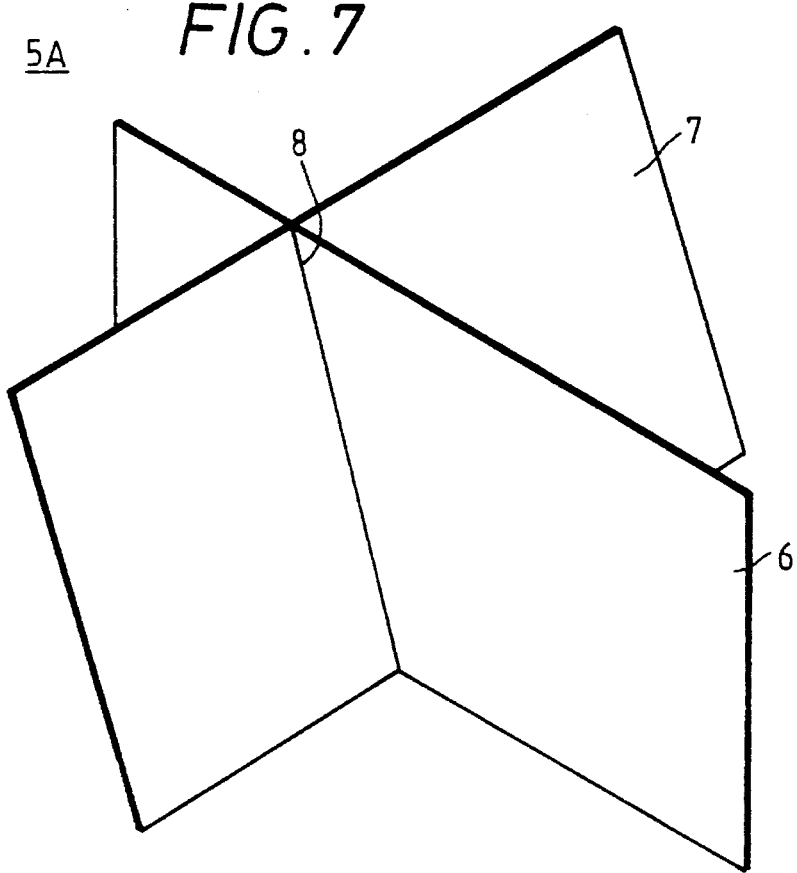
FIG. 7 is a diagram of an example of a three-dimensional video image corresponding to the synthesized video data obtained by the apparatus of FIG. 4.

In this situation, according to the above described embodiment, the key data S11, as compared with the key data SK shown in FIG. 3, is not binary data for the part of the video image around the intersection P, but is but interpolative data. As a result, the video image at the intersection 8 of the new three-dimensional video image 5A formed by the synthesized video data S12 looks smooth, as shown in FIG. 7.

As described above, the subtractor 11 is used to produce the difference data S3 between the first depth data S1Z for the first three-dimensional video image and the second depth data S2Z for the second three-dimensional video image, and the sign detector is used to detect a point of change of the sign of the difference data between the first and second depth data, and produce a detected signal. In addition, the arithmetic ratio calculator 15 is used to produce ratio data S7 from the difference data between the first and second depth data which is averaged with the delayed sign data S8. When a detected signal is produced from the sign detector, the first video data and the second video data are weighted on the basis of the averaged data and synthesized to form the synthesized video data. The intersection of the first three-dimensional video image and the second three-dimensional video image on the three-dimensional video image corresponding to the obtained synthesized video data then appears smooth.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

What is claimed is:

1. A video data signal processing apparatus comprising:

video signal supplying means for supplying first and second three-dimensional image data signals, said first three-dimensional image data signal representing a plurality of pixels and comprised of a first video data signal and a first depth data signal, and said second three-dimensional image data signal representing a plurality of pixels and comprised of a second video data signal and a second depth data signal;

synthesizing means for combining said first three-dimensional image data signal and said second three-dimensional image data signal with respective weightings in accordance with a key data signal to produce a composite three-dimensional video image data signal; and key data signal generating means including subtracting means for calculating a difference between said first depth data signal and said second depth data signal and for supplying an output signal therefrom which represents said difference and a sign of said difference, sign generating means for generating a sign signal representing said sign of said difference in the output signal from said subtracting means, arithmetic ratio means for generating a ratio signal representing a rate of change in said difference between said first depth data signal and said second depth data signal when the sign signal from said sign generating means changes in value, averaging means for averaging said ratio signal and said sign signal from said sign generating means at a rate corresponding to a pixel processing rate to produce an output signal, and means for selecting said key data signal from one of said output signal from said averaging means and said sign signal from said sign generating means.

2. A video data signal processing apparatus as in claim 1, wherein said key data generating means further includes sign detector means for detecting a change of said sign signal supplied by sign generating means and wherein said means for selecting includes switch means for selectively supplying one of said output signal from said averaging means and said sign signal as said key data signal in accordance with an output signal from said sign detector means, said switch means supplying said output signal from said averaging means when said change of said sign signal is detected.

3. A video data signal processing apparatus as in claim 2, wherein said sign detector means includes first delay means for delaying said sign signal from said sign generating means by an amount corresponding to one pixel period, second delay means for delaying an output signal of said first delay means by one said pixel period and for supplying an output signal therefrom, and exclusive-OR means receiving the output signals from said second delay means and said sign generating means for generating a detecting signal in accordance with said change of said sign signal.

4. A video data signal processing apparatus as in claim 1, wherein said arithmetic ratio means includes absolute value generating means for generating an absolute value of the output signal from said subtracting means, delay means for delaying an output signal of said absolute value generating means by an amount corresponding to one pixel period, and calculating means for calculating said rate of change in accordance with said output signal of said absolute value generating means, an output signal of said delay means and said sign signal from said sign generating means.

5. A video data signal processing apparatus as in claim 1, wherein said arithmetic ratio means generates said ratio signal (S7) representing the rate of change of said difference according to the following equation:

$$S7=S4/(S4+S6)$$

where S4 represents the output signal from said subtracting means and S6 represents the output signal from said subtracting means delayed by an amount corresponding to one pixel period.

6. A video data signal processing apparatus as in claim 5, wherein said averaging means averages said ratio signal (S7) of said arithmetic ratio means and said sign signal to obtain the output signal from said averaging means (S9) according to the following equation:

$$S9=(S7+S8)\div2$$

where S8 represents said sign signal.

7. A method of generating a composite three-dimensional video image data signal from first and second three-dimensional image data signals, in which said first three-dimensional image data signal represents a plurality of pixels and is comprised of a first video data signal and a first depth data signal and said second three-dimensional image data signal represents a plurality of pixels and is comprised of a second video data signal and a second depth data signal, said method comprising the steps of:

calculating a difference between said first depth data signal and said second depth data signal so as to form a difference signal;

generating a sign signal representing a sign of said difference signal;

calculating a rate of change of said difference between said first depth data signal and said second depth data signal when the sign signal changes in value;

averaging said rate of change of said difference and said sign signal at a rate corresponding to a pixel processing rate so as to form an average signal;

selecting a key data signal from one of said average signal and said sign signal; and combining said first three-dimensional image data signal and said second three-dimensional image data signal with respective weightings in accordance with said key data signal.

8. A video data signal processing apparatus as in claim 2, wherein said arithmetic ratio means includes absolute value generating means for generating an absolute value of the output signal from said subtracting means, delay means for delaying an output signal of said absolute value generating means by an amount corresponding to one pixel period, and calculating means for calculating said rate of change in accordance with said output signal of said absolute value generating means, an output signal of said delay means and said sign signal from said sign generating means.

9. A video data signal processing apparatus as in claim 3, wherein said arithmetic ratio means includes absolute value generating means for generating an absolute value of the output signal from said subtracting means, third delay means for delaying an output signal of said absolute value generating means by one said pixel period, and calculating means for calculating said rate of change in accordance with said output signal of said absolute value generating means, an output signal of said third delay means and said sign signal from said sign generating means.

10. A video data signal processing apparatus as in claim 2, wherein said arithmetic ratio means calculates the rate of change (S7) of said difference according to the following equation:

$$S7=S4/(S4+S6)$$

where S4 represents the output signal from said subtracting means and S6 represents the output signal from said subtracting means delayed by an amount corresponding to one pixel period.

11. A video data signal processing apparatus as in claim 3, wherein said arithmetic ratio means calculates the rate of change (S7) of said difference according to the following equation:

$$S7=S4/(S4+S6)$$

where S4 represents the output signal from said subtracting means and S6 represents the output signal from said subtracting means delayed by one said pixel period.

12. A video data signal processing apparatus as in claim 4, wherein said arithmetic ratio means calculates the rate of change (S7) of said difference according to the following equation:

$$S7=S4/(S4+S6)$$

where S4 represents said output signal from said absolute value generating means and S6 represents said output signal from said delay means.

* * * * *